United States Patent
Tabarovsky et al.

[11] Patent Number: 6,060,885
[45] Date of Patent: *May 9, 2000

[54] METHOD AND APPARATUS FOR DETERMINING THE RESISTIVITY AND CONDUCTIVITY OF GEOLOGICAL FORMATIONS SURROUNDING A BOREHOLE

[75] Inventors: Leonty A. Tabarovsky; Antonio Fabris; Alberto G. Mezzatesta, all of Houston, Tex.

[73] Assignee: Western Atlas International, Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/874,218

[22] Filed: Jun. 13, 1997

Related U.S. Application Data

[63] Continuation of application No. 08/576,918, Dec. 22, 1995, abandoned, which is a continuation of application No. 08/420,910, Apr. 11, 1995, abandoned, which is a continuation of application No. 08/138,493, Oct. 14, 1993, abandoned.

[51] Int. Cl.$^7$ ............................................. G01V 3/18
[52] U.S. Cl. ............................................. 324/366
[58] Field of Search .................. 324/366, 354, 324/355, 358, 367, 368, 371

[56] References Cited

U.S. PATENT DOCUMENTS 2,920,266  1/1960  Owen ........................................ 324/366
4,675,611  6/1987  Chapman et al. ....................... 324/366

*Primary Examiner*—Walter E. Snow
*Attorney, Agent, or Firm*—Darryl M. Springs

[57] ABSTRACT

A differential array instrument for determining selected parameters of an earth formation surrounding a borehole, including an instrument mandrel carrying a single source electrode for injecting an electrical current of a predetermined value into the formation surrounding the borehole, and an array of a plurality of measurement electrodes uniformly and vertically spaced from said source electrode along the instrument mandrel. A predetermined group of the uniformly and vertically spaced electrodes are adapted to derive first and second difference potentials between the predetermined group of electrodes, wherein successive ones of a plurality of the predetermined group of selected measuring electrodes uniformly and vertically spaced at increasing distances from the source electrode axially of the borehole are adapted to derive a plurality of the first and second difference potentials between the predetermined group of electrodes. The first and second difference potentials are derived in response to current from the source electrode travelling generally vertically in an orientation generally parallel to the axis of the borehole in the formation to successive ones of the predetermined groups of selected measuring electrodes and which plurality of first and second difference potentials may be correlated to a plurality of values representative of the selected formation parameters. The plurality of values representative of the selected formation parameters may provide a profile of the selected parameters over an increasing radial distance from the borehole.

4 Claims, 9 Drawing Sheets

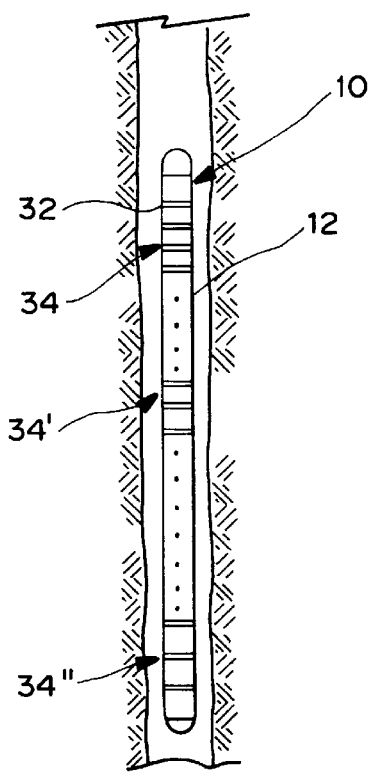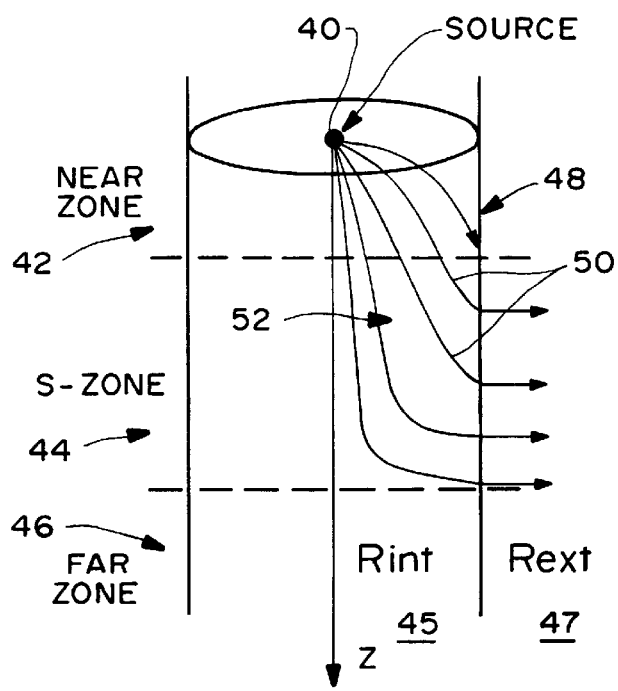

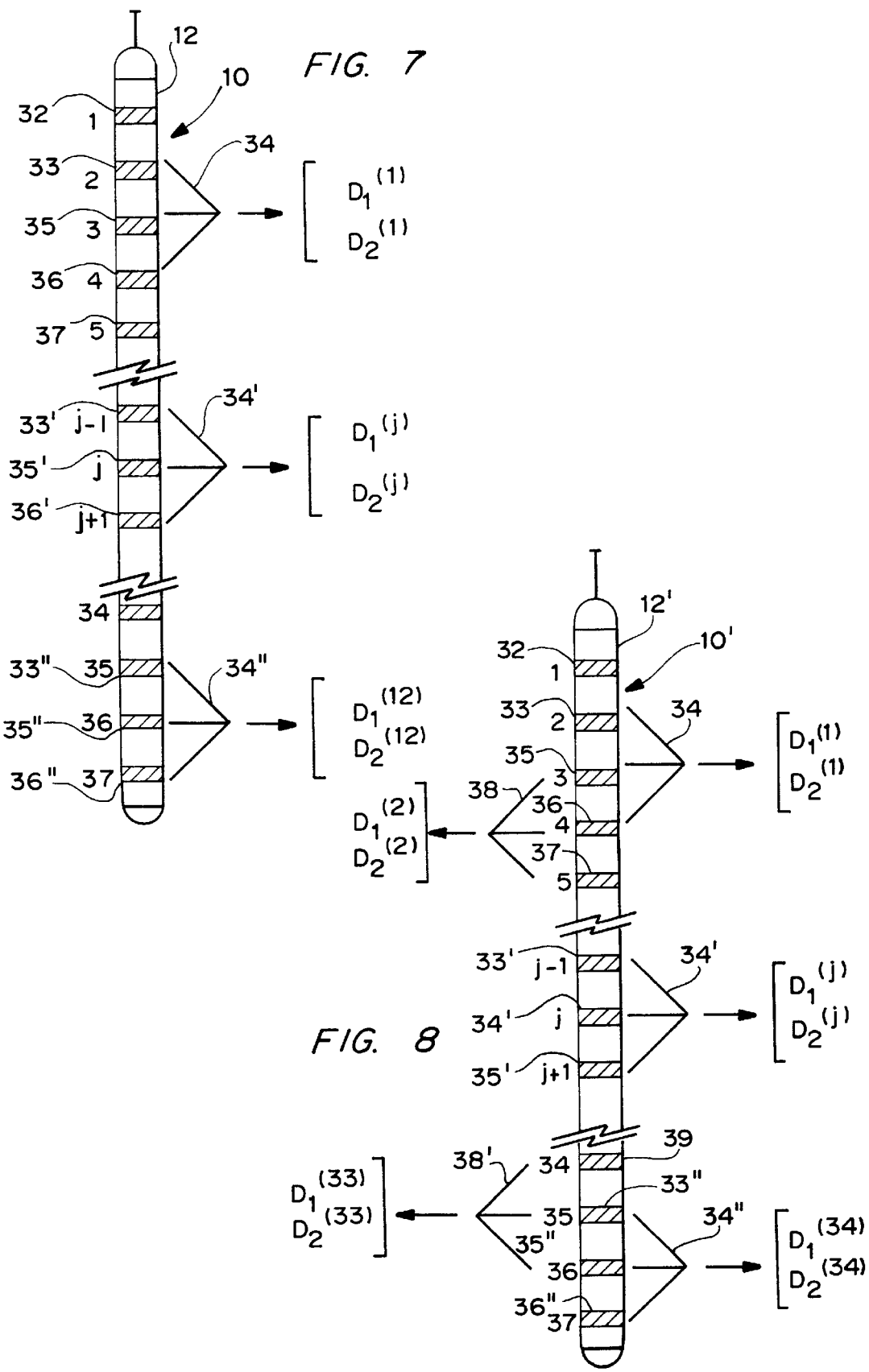

METHOD AND APPARATUS FOR DETERMINING THE RESISTIVITY AND CONDUCTIVITY OF GEOLOGICAL FORMATIONS SURROUNDING A BOREHOLE

This is a continuation of application Ser. No. 08/576,918 filed on Dec. 22, 1995 in the U.S.A. (now abandoned), which is a continuation of application Ser. No. 08/420,910 filed on Apr. 11, 1995 in the U.S.A. (now abandoned), which is a continuation of application Ser. No. 08/138,493 filed on Oct. 14, 1993 in the U.S.A., now abandoned.

BACKGROUND OF THE INVENTION

1. Field of the Invention

This invention relates to downhole electrical logging methods and apparatus for more accurately determining resistivity and conductivity measurements of the formation, and more particularly the utilization of a differential array of measuring electrodes that are selectively coupled to a single source electrode. The voltage distribution in an earth formation penetrated by a borehole resulting from imposed current flow in the formation permits a measurement of resistivity and/or conductivity. From the resistivity measurement, the hydrocarbon saturation of the formation can be determined.

The formation being logged is penetrated by a borehole containing drilling fluid and formation fluids have a resistivity (Rm) different than the resistivity of the adjacent formation. In an invaded zone in which the drilling fluid has penetrated has a resistivity (Rxo) different than the true resistivity (Rt) of the formation. The measurement of Rt for the formation is dependent on the effects of Rm and Rxo, coupled with the variations in the diameter (Dbh) of the borehole and the radius of the invaded (Rinv) zone.

Certain electrical logging instruments have been developed to obtain better measurements of Rt, such as the non-focused electrical logs (conventional resistivity logs). Another is the focused electrical logs (laterologs for measuring resistivity) which use focusing currents to control the paths taken by the measuring current. However, the focused logs have been successful in measuring the uncontaminated formation resistivities, not affected by mud filtration, while the unfocused logs have been successful in measuring near formation resistivities in the invaded zone, but no single tool has been able to provide accurate resistivity measurements over a significant portion of the radial depth of the formation surrounding the borehole including the invaded zone and the uncontaminated zones.

One primary objectives of the differential array instrument is to provide a better determination of the resistivity of the invaded ($R_{xo}$) and uncontaminated (Rt) zones in a wider set of well conditions, which in turn will produce a more predictable pore content and saturation value. Another primary objective of the differential array instrument is to provide a more complete visualization of the resistivity profile in the invaded zone and the uncontaminated zones in order to provide additional petrophysical data to the well owner.

Accordingly, one primary feature of the present invention is to provide a differential resistivity instrument that will more accurately determine resistivity derived parameters, such as flushed zone resistivity, uncontaminated zone resistivity, invasion zone radius and fluid saturation over a wider set of invasion conditions.

Another feature of the present invention is to provide a better determination of movable and residual oil saturation.

Still another feature of the present inventions to provide a more accurate definition of hydraulic units.

Yet another feature of the present invention is to provide a complete visualization of the resistivity profile in the invaded zone.

BRIEF SUMMARY OF THE INVENTION

A differential array instrument and a method for determining selected parameters of an earth formation surrounding a borehole are provided, including an instrument mandrel carrying a single source electrode for injecting an electrical current of a predetermined value into the formation surrounding the borehole, and an array of a plurality of measurement electrodes uniformly and vertically spaced from said source electrode along the instrument mandrel. A predetermined group of the uniformly and vertically spaced electrodes are adapted to derive first and second difference potentials between the predetermined group of electrodes, wherein successive ones of a plurality of the predetermined group of selected measuring electrodes uniformly and vertically spaced at increasing distances from the source electrode axially of the borehole are adapted to derive a plurality of the first and second difference potentials between the predetermined group of electrodes. The first and second difference potentials are derived in response to current from the source electrode travelling generally vertically in an orientation generally parallel to the axis of the borehole in the formation to successive ones of the predetermined groups of selected measuring electrodes and which plurality of first and second difference potentials may be correlated to a plurality of values representative of the selected formation parameters. The plurality of values representative of the selected formation parameters may provide a profile of the selected parameters over an increasing radial distance from the borehole.

BRIEF DESCRIPTION OF THE DRAWINGS

In order that the manner in which the above-recited features and principles of the invention are attained can be understood in detail, a more particular description of the invention may be had by reference to specific embodiments thereof which are illustrated in the accompanying drawings, which drawings from a part of this specification.

In the drawings:

FIG. 1 is a side-elevational view, partly in vertical cross-section, of a differential array logging instrument operating in a borehole.

FIG. 2 is a diagrammatic view of the electric field distribution from a point source disposed in an axially-symmetric cylindrically-layered medium consisting of two concentric homogeneous media having different resistivities.

FIG. 7 is a side elevational view of one embodiment of the differential array resistivity logging instrument showing the electrode array distribution and relative spacing.

FIG. 8 is a side elevational view of a second embodiment of the differential array resistivity logging instrument showing the electrode array distribution and relative spacing.

DETAILED DESCRIPTION OF THE PREFERRED EMBODIMENTS

Figure 3:
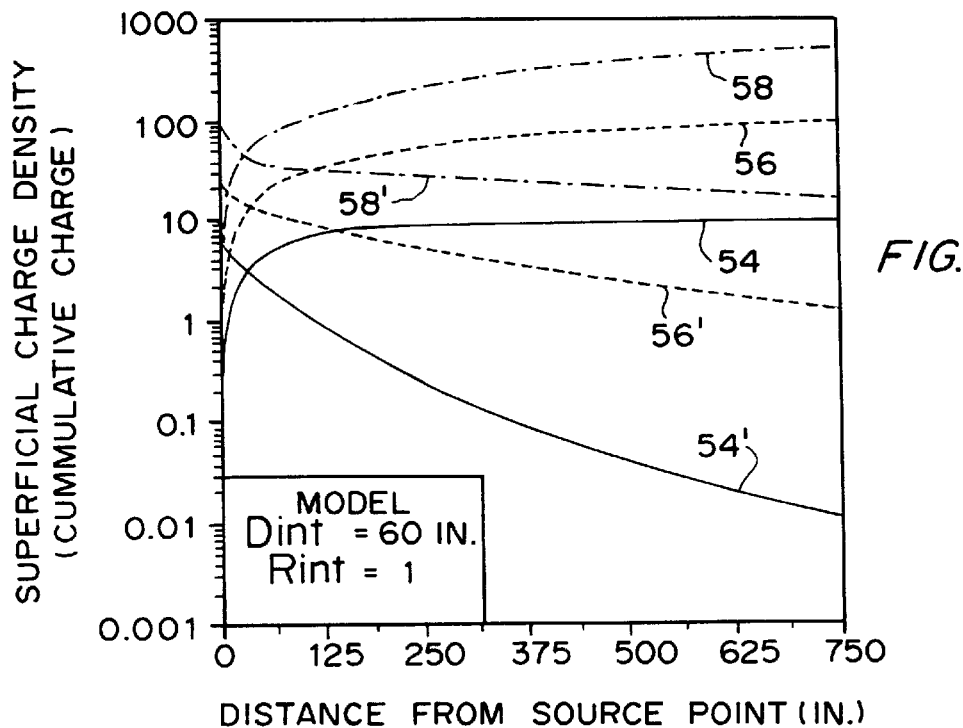
FIG. 3 is a diagram showing the charge density and cumulative charge distribution along the interface of the two concentric homogenous media shown in FIG. 2 for predetermined values of the ratio of $R_{ext}/R_{int}$.

Referring now to FIG. 1, the differential array resistivity instrument 10 according to the present invention will be described. The instrument 10 is shown disposed in a borehole 14 penetrating an earth formation 16 and supported by a wire cable 18. The cable 18 is supported and guided by a sheave wheel 20 suspended from a well structure 22 in place on the earth's surface 24 over the wellbore 14. The cable 18 is stored on a cable drum 26 which is controlled at the surface to lower and raise the differential array instrument 12 within the wellbore 14 at a predetermined logging speed. Commands for controlling the operation of the instrument 12 and the data collected by the instrument are transmitted electrically through the cable 18 and via interconnecting cable 30 to an electronics package 28 located at the surface.

The instrument 10 has an elongated mandrel or body 12, a single source electrode 32 located near the upper end of the instrument housing, and several groups of identical measuring electrodes 34, 34' and 34" uniformly distributed along the axis of the tool mandrel, which allow for performing a number of measurements at each logging depth as will be hereinafter further described.

FIG. 2 shows an axially-symmetric cylindrically-layered medium consisting of two concentric homogeneous media (45 & 47) with resistivities Rint and Rext, respectively. Assuming a point source 40 is placed at the axis of symmetry of the formations and injects an electrical current having a predetermined intensity into the medium. The lines of electric current 50 tend to follow a spherical path in the vicinity of the source. The distortion of the electrical current field, caused by the concentration of charges at the interface 48 between the two media 45 and 47, induces the current to turn its flow in the direction of the axis of symmetry. After a certain distance, the lines of current penetrate into the formation and return to the return electrode at infinity.

However, three vertically disposed zones in the current path can be identified. The three zones are: near electrode zone 42 in which currents flow in all directions, the intermediate zone (also known as S-zone or conductance zone) 44 in which currents flow vertically and generally parallel to the axis of symmetry with some leakage into the formation, and the far zone 46 in which currents definitely flow into the formation to return at infinity. The current path is essentially governed by the distribution of charges at the interface 48. The speed at which the superficial concentration of charges decreases with the distance from the source, depends on the contrast of conductivities of the two media. The higher the contrast the lower the decreasing rate, and the farther the far zone appears. As may be seen, the area at 52 is an area through which the electrical current field has lines that are moving vertically through the formation media and generally parallel to the axis of symmetry. The measurement of these lines of current from the source electrode to the vertically-spaced measurement electrodes will provide measurements that are related to the actual resistivity, and will provide an opportunity for obtaining "sounding" measurements for determining resistivity measurements in increasing radial depths within the zone.

Figure 4:
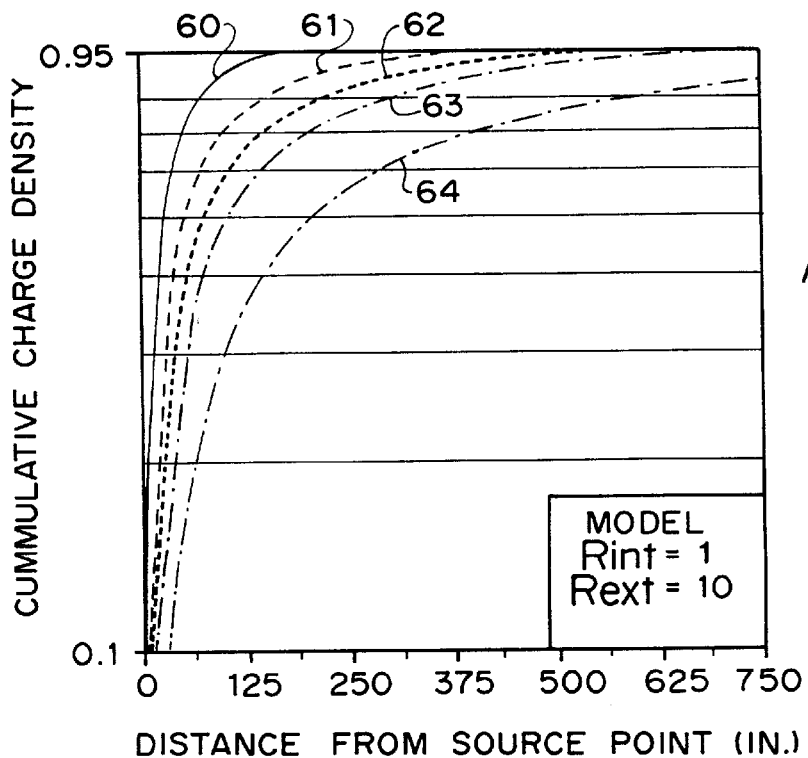
FIG. 4 is a diagram showing the cumulative superficial charge density distribution along the interface of the two concentric homogeneous media shown in FIG. 2 for predetermined value of the ratio of $R_{ext}/R_{int}$.

FIG. 3 shows the modeled charge density distributions and cumulative charge values for an interface diameter, $D_{int}$ of 60 inches and a resistivity contrast of $R_{ext}/R_{int}$ of 10, 100, and 1000 as curves 54—54', 56—56' and 58—58'. As can be seen, as the contrast increases, the superficial charge density value decreases at a smaller rate, i.e, the cumulative charges takes longer distances to reach, for example, the 95% value. The distance at which the cumulative values reach 95% can be considered as the end of the conductance zone (S-zone), and consequently, the beginning of the far zone. It shows that the higher the contrast, the longer the zone. This effect can also be seen in FIG. 4 which shows, for a contrast $R_{ext}/R_{int}$ of 10, the cumulative curves 60, 61, 62, 63 and 64 up to 95% for diameters of the inner conductive zone equal to 30, 60, 90, 120 and 240 inches, respectively. The analysis of results for different contrasts and different interface diameters permits us to say that the length of the S-zone is approximately proportional to the diameter of the internal conductive zone and to the square root of the resistivity contrast between external and internal zones.

Figure 5:
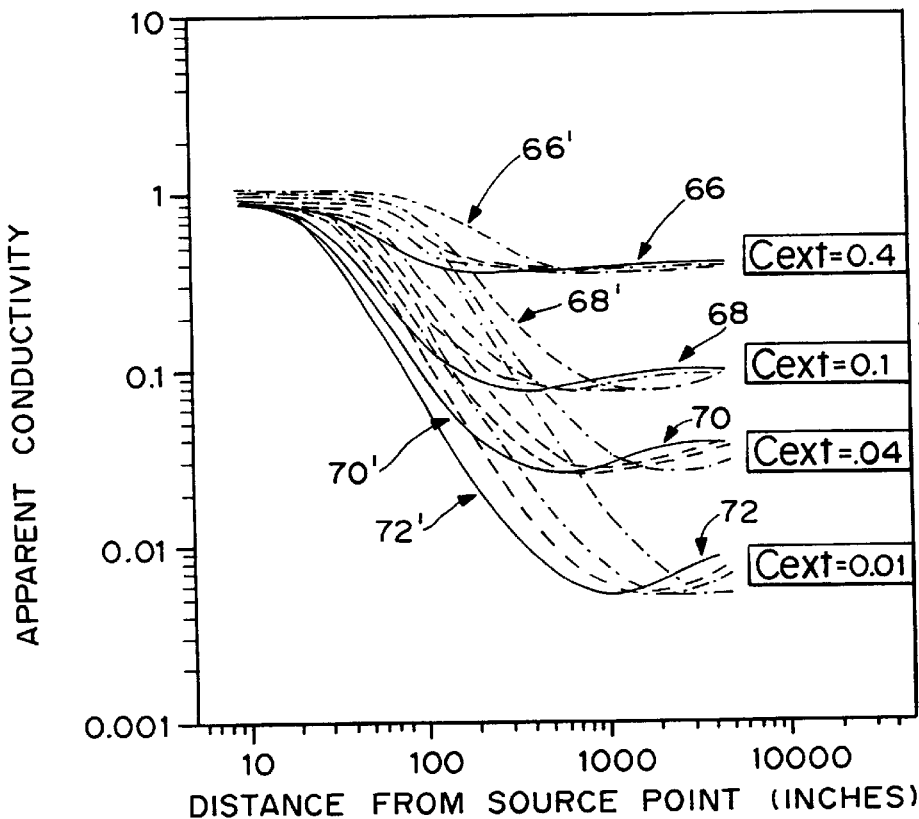
FIG. 5 is a diagram showing the normalized first differences distribution along the resistivity axis for preselected values of conductivity contrasts and interior zone diameters of the interior zone shown in FIG. 2.

The effect of the three different zones on a "lateral tool", i.e., consisting of a source electrode and a pair of voltage electrodes, used to measure the voltage difference, can be seen in FIG. 5, which shows, for a set of four conductive internal zones having diameters of 60, 90, 120 and 240 inches, and a set of conductivity ("C") contrasts, with $C_{int}$ equal to 1, and $C_{ext}$ having values of 0.4, 0.1, 0.04 and 0.01 (curves 66, 68, 70 and 72, respectively), the normalized first difference (apparent conductivity) as a function of the distance from the source point. The portions of the curves 66, 68, 70 and 72 are essentially characterized by three zones mentioned above: the near zone, in which apparent resistivities are affected very little by the external resistive region; the intermediate zone (S-zone) shown at the sloping portions of curves 66', 68', 70' and 72', in which apparent conductivities decrease almost linearly with distance (in a log-log plot); and the far zone, in which the asymptotic solution is reached and where the apparent conductivities provide the actual conductivity contrast. We can see that the asymptotic regions, i.e., the far zones, are reached at different depths depending on the resistivity contrasts and the diameter of the internal zone.

Figure 6:
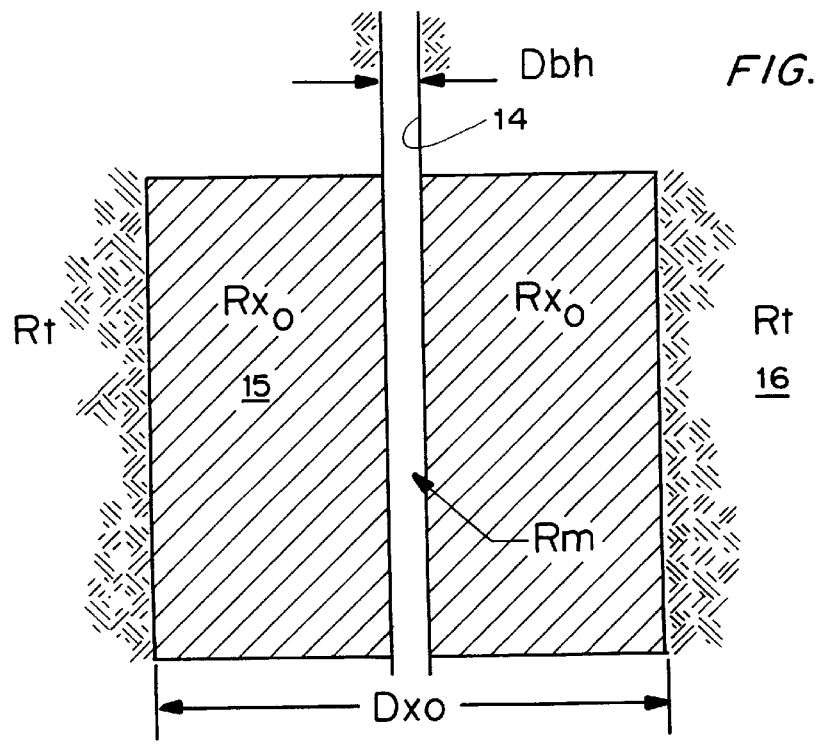
FIG. 6 is a diagrammatic view of a portion of the formation surrounding the borehole, including the measurement of resistivity for the borehole fluid (Rm) showing the borehole diameter (Dbh), the diameter of the invaded formation zone ($D_{xo}$) having a resistivity ($R_{xo}$), and the uncontaminated formation resistivity Rt.

FIG. 6 illustrates a typical idealized cylindrical model of the formation surrounding the borehole 14 penetrating an earth formation 16. The borehole has a known diameter Dbh, the borehole fluid in the borehole 14 has a resistivity $R_m$, while the borehole fluid invaded zone is shown as the cross-hatched area 15, having a resistivity $R_{xo}$. The radius of the invaded zone 15 is $INV_r$ and the diameter of the invaded zone is $D_{inv}$. The uncontaminated zone of the formation 16 is the area beyond the contaminated zone 15 and has a resistivity $R_t$. Referring to FIG. 2, there is a correlation between the near zone and S-zones as defined by the current field lines moving vertically in the media (formation) and generally parallel to the axis of symmetry of the tool and the invaded zone 15 of FIG. 6. Depending on the spacing of the source electrode and the remaining electrodes of the array, and the resistivity of the formation, the near zone and S-zone will generally fall within the invaded zone, thus providing an opportunity for more accurately measuring the formation parameters of the invaded zone to determine $R_{xo}$ and ultimately measure the formation resistivity of the uncontaminated zone, $R_t$.

Referring now to FIGS. 7 and 8, two embodiments of the differential array instrument 10 and 10' will be further described. In FIG. 7, the instrument 10 includes a mandrel 12 carrying a single source electrode 32 and a plurality of measuring electrodes 33, 35, 36, 37, etc. vertically spaced in equal increments along the axis of the mandrel 12. The number of measuring electrodes chosen are 36, which including the source electrode, makes a total of 37 electrodes which are marked 1–37 in FIG. 7. In the embodiment of FIG. 7, a group 34 of three successive electrodes 33, 35 and 36 are used to measure first and second potential differences, $D_1$ and $D_2$ respectively. In operation, the source electrode 32 injects an electrical current of a predetermined value into the formation and it is received by successive lower vertical groups of three electrodes as at 34' and 34". In the embodiment shown in FIG. 7, the 36 measuring electrodes would produce 12 measurements from successive electrode groups 34, 34', 34", etc. for measuring the first and second potential differences, thus: at $34\text{-}D_1^{(1)}$ and $D_2^{(2)}$, at $34'\text{-}D_1^{(j)}$ and $D_2^{(j)}$, and at $34''\text{-}D_1^{(12)}$ and $D_2^{(12)}$. Using the electrode group identified as 34", the first vertically disposed measurement electrode is identified as j−1 (33'), the center electrode is identified as j (35'), and the third or lower electrode is identified as j+1 (36'). The first potential difference $D_1^{(j)}$ is calculated as:

$$D_1^{(j)} = \frac{V_{j+1} - V_{j-1}}{2} \quad (1)$$

and, $D_2^{(1)}$=can be calculated by:

$$D_2^{(j)} = V_{j+1} - 2V_j + V_{j-1} \quad (2)$$

The differential conductance $DC^j$ is determined as:
$DC^j =$ $$\frac{D_2^{(j)}}{\left[D_1^{(j)}\right]^2}$$

(3)

Accordingly, each measurement unit provides first and second differences ($D_1$ & $D_2$) at each depth level. The differential conductance (DC) is also available.

In FIG. 8, a second embodiment of the differential array instrument 10' will be described. The instrument 10 includes a mandrel 12 carrying a single source electrode 32 and a plurality of measuring electrodes 33, 35, 36, 37, etc. vertically spaced in equal increments along the axis of the mandrel 12. The number of measuring electrodes chosen are 36, which including the source electrode, makes a total of 37 electrodes which are marked 1–37. In the second embodiment shown in FIG. 8, a group 34 of three successive electrodes 33, 35 and 36 are used to measure first and second potential differences, $D_1$ and $D_2$ respectively. In operation, the source electrode 32 injects an electrical current of a predetermined value into the formation and it is received by successive lower vertical groups of three electrodes 35, 36 and 37 as at 38 and electrodes 39, 33" and 35" as at 38'. Each succeeding electrode group would overlap the preceding electrode group by at least one common measuring electrode. In the embodiment shown in FIG. 8, the 36 measuring electrodes would produce 34 measurements from successive electrode groups 34, 38, 34', 38', 34", etc. for measuring the first and second potential differences, thus: at $34\text{-}D_1^{(1)}$ and $D_2^{(1)}$, at $38\text{-}D_1^{(2)}$ and $D_2^{(2)}$, at $34'\text{-}D_1^{(j)}$ and $D_2^{(j)}$, at $38'\text{-}D_1^{(33)}$ and $D_2^{(33)}$, and $34''\text{-}D_1^{(34)}$ and $D_2^{(34)}$.

Sounding is the measuring of a property as a function of depth. In electrical resistivity logging, this can be a series of electrical resistivity readings made with successively greater electrode spacing while maintaining one point in the array fixed for giving resistivity-versus-depth information. From the discussion above with relation to FIGS. 1–8, it can be seen that sounding can be achieved in the near zone and/or S-zone in which the induced current lines generally travel vertically in the media (formation) in a direction generally parallel to the axis of symmetry through the point source (the borehole). The number of measurements taken will be determined by the number of electrode groups in the array, and as the distance to the lower receiving electrode groups increases vertically, the electrical current field penetrates further into the media (formation) (see FIG. 2), and, accordingly, succeeding measurements from short ("S") to longer ("L") spacings will represent measurements that correlate to actual resistivity measurements over an increasing radial distance of the formation.

Figure 9A:
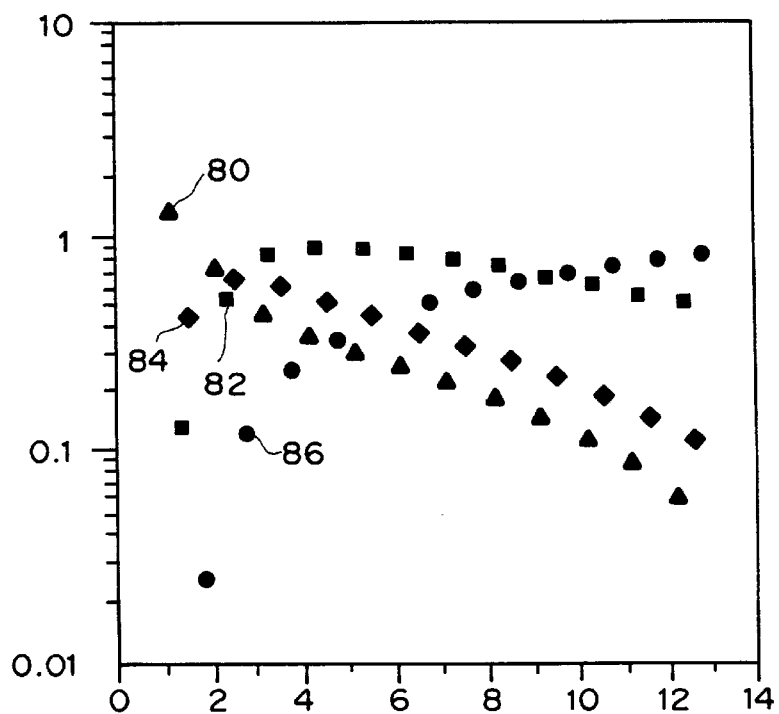
FIG. 9A is a diagram of the sensitivity values for the first differences in a resistive formation layer using the differential array resistivity instrument.
Figure 9B:
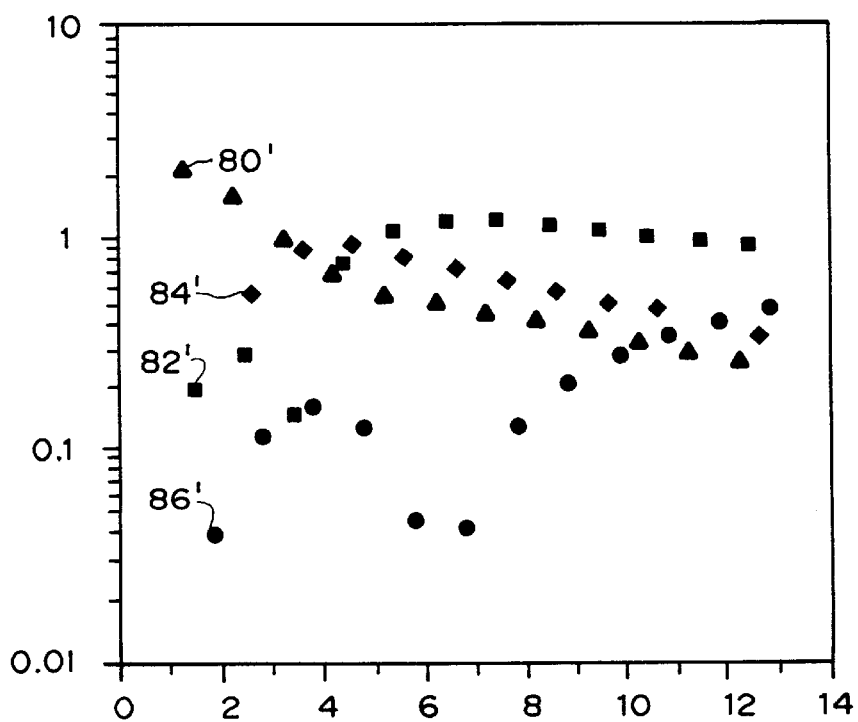
FIG. 9B is a diagram of the sensitivity values for the second differences in an axially-symmetric medium using the differential array resistivity instrument.
Figure 9C:
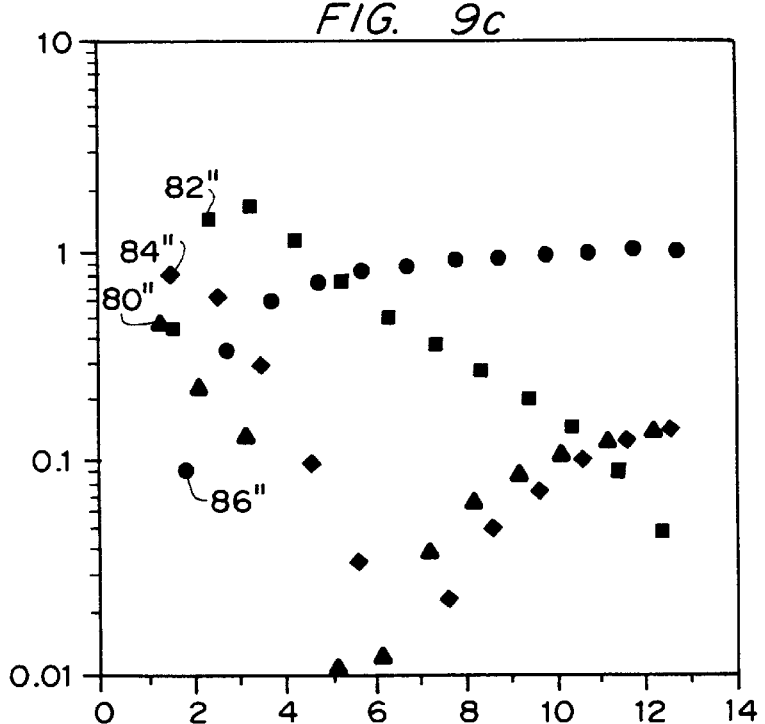
FIG. 9C is a diagram of the sensitivity values for the calculated differential conductance in an axially-symmetric medium using the differential array resistivity instrument.

The depth of investigation for each measurement unit in the array of electrodes (1–37) is defined as the diameter of invasion that corresponds to the inflection point of the anomalous effect, i.e., the point at which the sensitivity with respect to the invasion diameter reaches its maximum value. Sensitivities were used to evaluate the measurements performed by the array of electrodes. In this case, three types of measurements were analyzed: first differential in potential in voltage ($D_1$), second differential in potential ($D_2$), and the differential conductance (DC). Sensitivities were calculated for the differential array configuration considering earth models described by cylindrical and mixed boundaries. FIGS. 9A–9C show the sensitivity for the differential array in a cylindrically-layered media, having the following parameters: $D_{bh}$=8 inches, $INV_r$=20 inches, $R_m$=1, $R_{xo}$=10 and $R_t$=100. The curves represent the sensitivities of all three types of measurements with respect to borehole diameter, $D_{bh}$ (80, 80' and 80"), invasion radius, $INV_r$ (82, 82' and 82"), invaded zone resistivity, $R_{xo}$ (84, 84' and 84") and uncontaminated zone resistivity, $R_t$ (86, 86' and 86").

An analysis of FIGS. 9A–9C, graphically shows a few exceptional features of the different measurements:

(a) Short $D_1$ and $D_2$ measurements have a high sensitivity to borehole diameter, $D_{bh}$. On the contrary, DC measurements have a very low sensitivity to borehole diameter, $D_{bh}$.

(b) The $D_1$ and $D_2$ measurements need larger spacings (distances form the source) to be sensitive to the invasion parameters than the DC measurements. As a consequence, the long DC measurements are more sensitive to $R_t$ than the $D_1$ and $D_2$ measurements.

(c) The maximum values of DC sensitivities corresponding to the different rock parameters are reached at different positions.

Figure 10A:
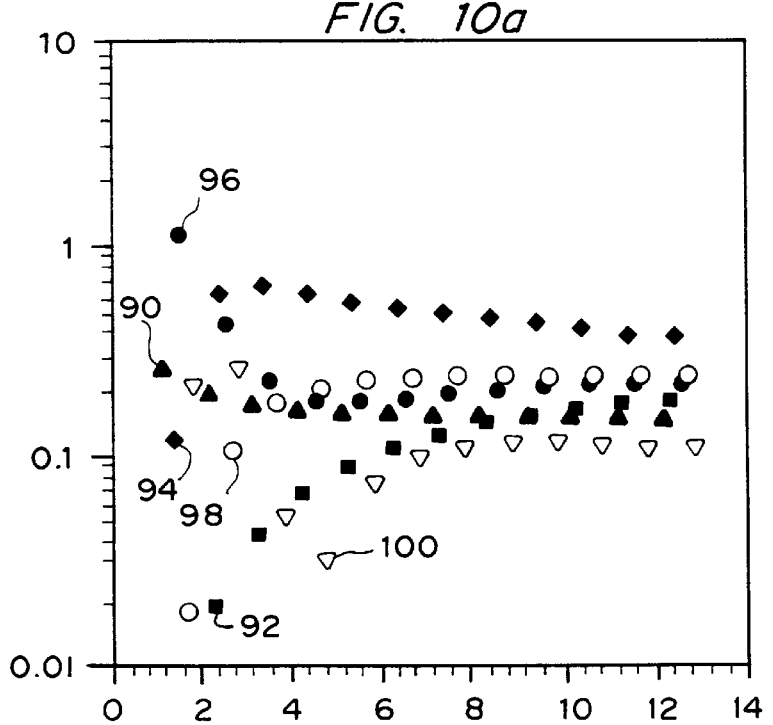
FIG. 10A is a diagram of the sensitivity values for the first differences in a resistive formation layer using the differential array resistivity instrument.
Figure 10B:
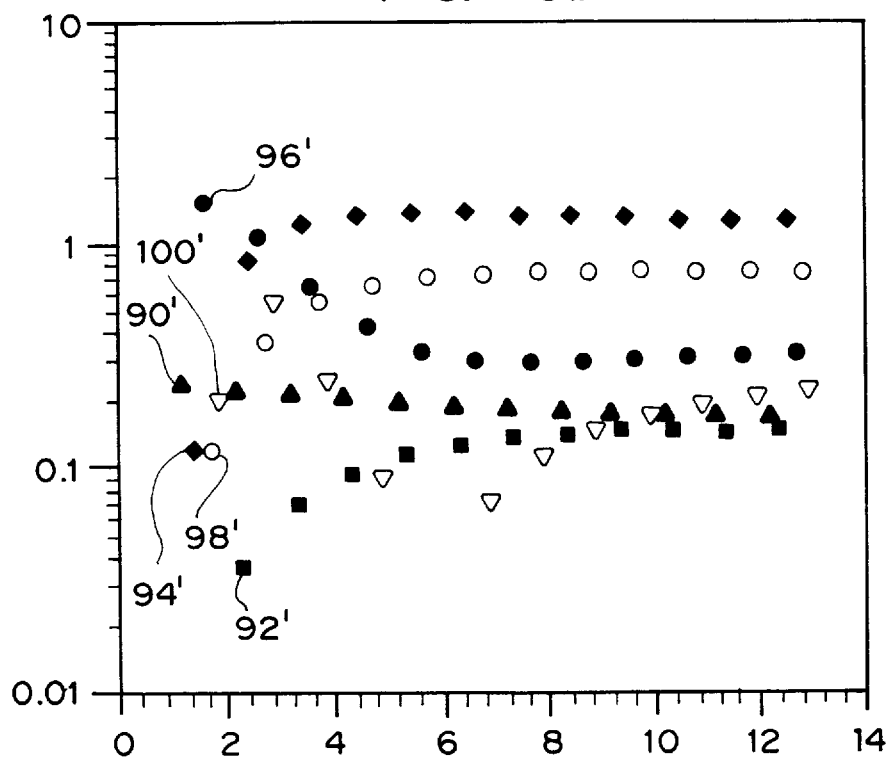
FIG. 10B is a diagram of the sensitivity values for the second differences in a resistive formation layer using the differential array resistivity instrument.
Figure 10C:
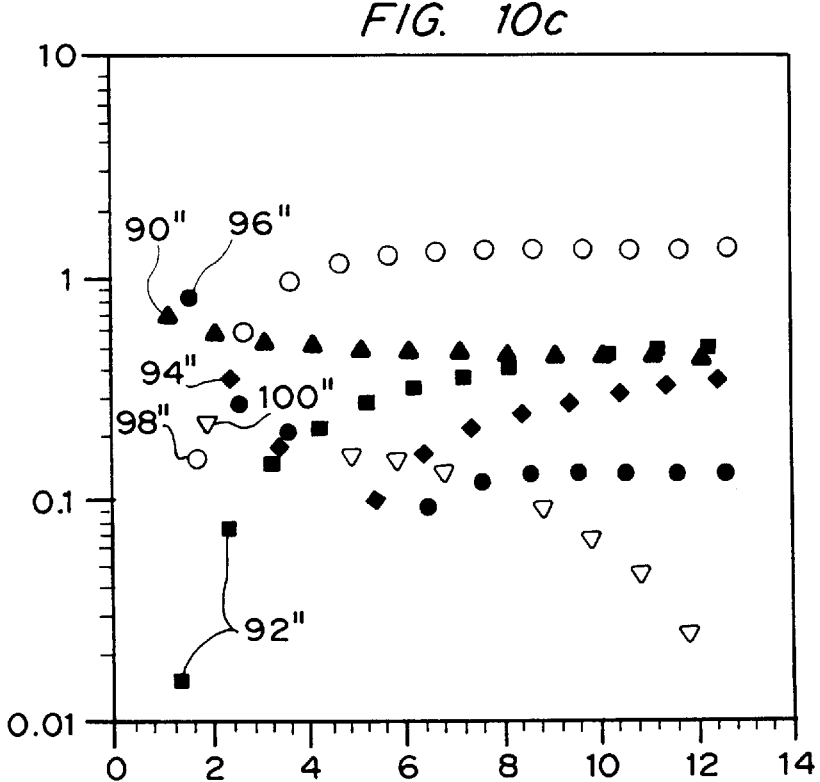
FIG. 10C is a diagram of the sensitivity values for the calculated differential conductance in a resistive formation layer using the differential array resistivity instrument.

The sensitivity analysis is extended to the case of mixed boundaries (cylindrically combined with horizontally-layered media) in FIGS. 10A–10C which shows the sensitivities of a 24-inch resistive (H) layer having the following parameters: $D_{bh}$=8 inches, $INV_r$=20 inches, $R_m$=1, $R_{xo}$=10 and $R_t$=100. The curves represent the sensitivities of all three types of measurements with respect to invaded zone resistivity, $R_{xo}$ (90, 90' and 90"), uncontaminated zone resistivity, $R_t$ (92, 92' and 92"), $R_{sh}$ (94, 94' and 94"), borehole diameter, $D_{bh}$ (96, 96' and 96'), invasion radius, $INV_r$ (98, 98' and 98"), and the thickness of the layer, H (100, 100' and 100"). As can be seen, measurements $D_1$ and $D_2$ are mainly sensitive to the shoulder resistivity, $R_{sh}$, as shown at 94 and 94'. At the same time, the DC measurements are almost insensitive to the shoulder resistivity, $R_{sh}$ (94"), and highly sensitive to the invasion parameters $INV_r$ (98") and $R_{xo}$ (90").

Figure 11:
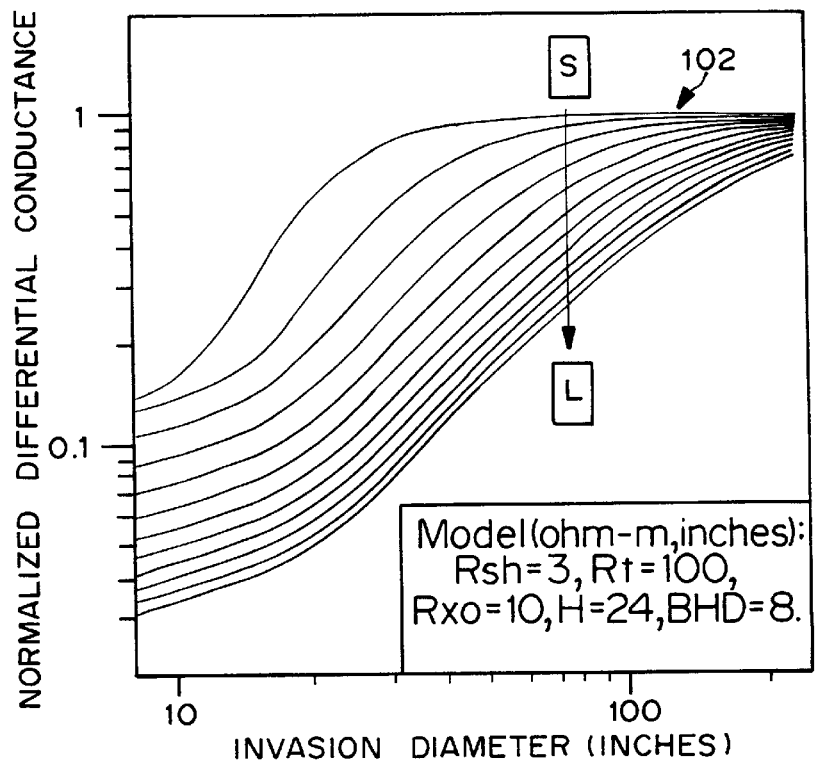
FIG. 11 is a diagram showing the anomalous effect due to the uncontaminated zone in a resistive formation for all measurements of the differential array resistivity instrument.
Figure 12:
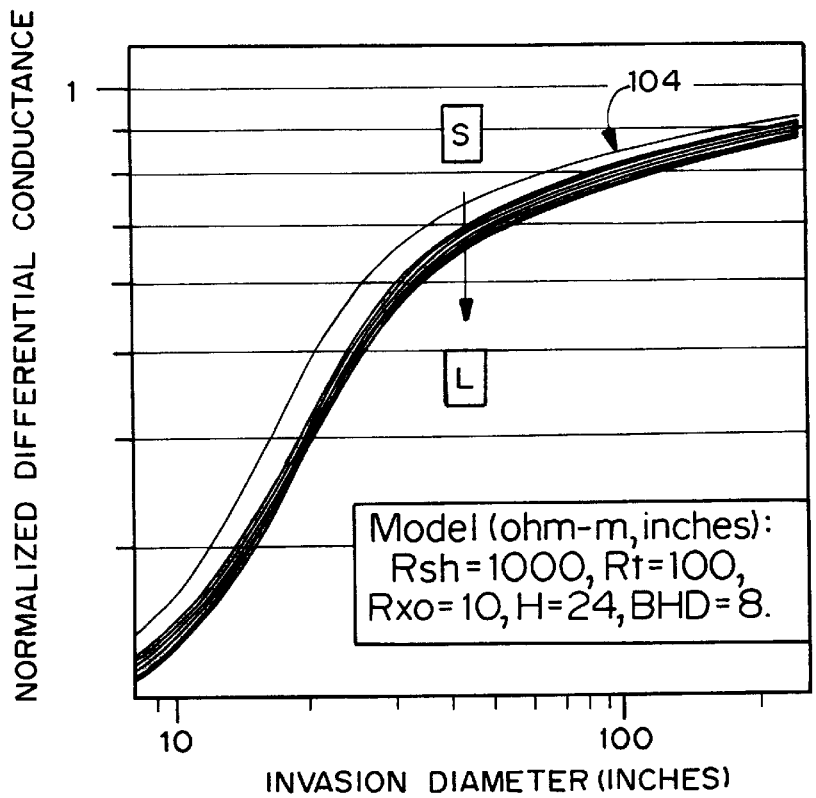
FIG. 12 is a diagram showing the anomalous effects due to the uncontaminated zone in a conductive formation for all measurements of the differential array resistivity instrument.

The behavior of the sensitivities calculated in a thin layer situation as shown in FIGS. 10A–10C is confirmed by looking at the anomalous effect due to the uncontaminated zone in both the resistive and conductive cases. FIGS. 11 and 12 show these results for resistive and conductive layers, respectively. It can be seen that in a thin resistive layer (FIG. 11), different measurements at 102 moving from "short spacing" ("S") to "longer spacing" ("L") are affected differently by the uncontaminated zone. In fact, the anomalous effects are remarkably different. However, this behavior is not seen in the case of a conductive layer (FIG. 12) in which all the measurements at 104 are almost equally affected by the uncontaminated zone.

Figure 13:
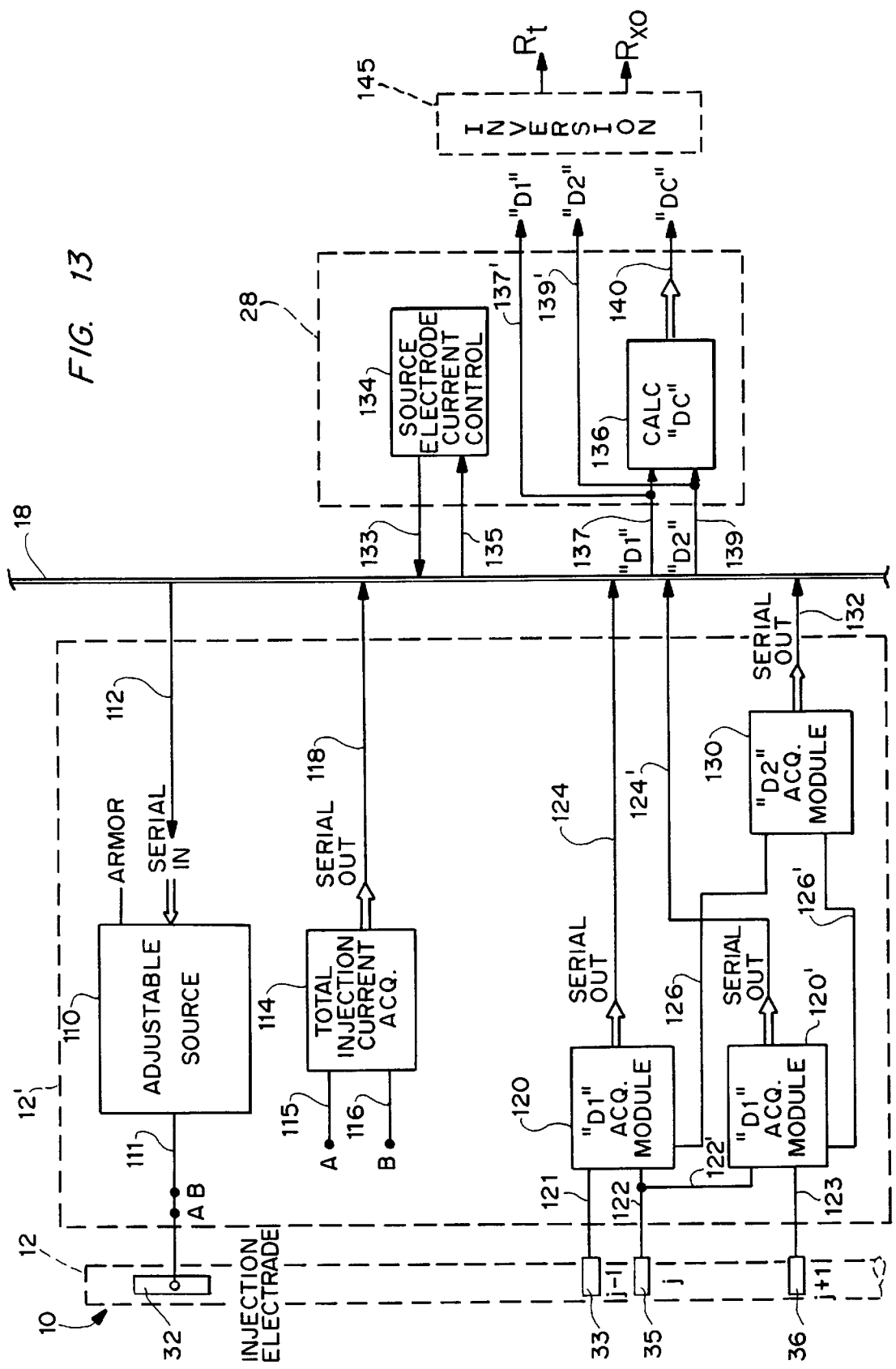
FIG. 13 is a block diagram schematic of the electronic circuitry used in the data interpretation for determining the first and second differences and the differential conductance as used with the differential array resistivity instrument.

FIG. 13 is a block diagram schematic of the basic electrical control and measurement functions, i.e., source electrical current control, the measurement of $D_1$ and $D_2$ and the calculation of DC, if desired. Downhole, the electrical current source and $D_1$ and $D_2$ measurement functions are packaged as shown as 12' in the tool mandrel or housing 12 of the differential array instrument 10. The source electrode 32 is connected by conductor 111 to an adjustable current source 110 for adjusting the source current injected by the source electrode 32. The adjustable current source 110 is interconnected to cable 18 at 112 for connection to the surface electronics circuit 28. The total current applied from the adjustable source 110 to the electrode 32 is monitored by a monitoring circuit 114 which is connected between measuring points A and B in conductor 111 by connecting conductors 115 and 116. The output of the monitoring circuit 114 is interconnected at 118 to cable 18 for connection to the surface electronics circuit 28.

The electronics circuit 28 is located on the surface, typically in a truck or skid (not shown) located at the well site, and has a source electrode current control circuit 134 for automatically controlling the source electrode electrical current applied to the source electrode 32 and injected into the formation. The control circuit 134 is interconnected to the cable 18 at 133, and receives a reading of the total current supplied to the electrode 32 from the monitoring circuit 114 (downhole) via interconnection 135 to cable 18.

Each electrode group 33, 35, and 36 has a pair of associated $D_1$ calculation circuits 120 and 120'. The circuit 120 is interconnected across measuring electrodes 33, 35 and 36 by conductors 121 and 122, respectively. The circuit 120' is interconnected across measuring electrodes 35 and 36 by conductors 122, 122' and 123, respectively. One output of each circuit 120 and 120' is interconnected to the cable 18 at 124 and 124' for sending the values of $D_1$ and $D_2$ to the surface electronic circuit 28. A second output of $D_1$ circuits 120 and 120' is applied to the $D_2$ calculation circuit 130 by conductors 126 and 126', respectively. The $D_2$ output of circuit 130 is interconnected to cable 18 at 132 for application to the surface electronics circuit 28. The surface electronics circuit 28 includes a DC calculation circuit 136 which receives the $D_1$ and $D_2$ values from the downhole circuits 120, 120' and 130 via interconnections 137 and 139 to the cable 18 for calculating the value of DC in accordance with equation (3). The values of $D_1$, $D_2$ and DC may be separately provided externally of the circuit 28 via connections 137, 137' and 140, respectively.

As hereinbefore described, the values of $D_1$, $D_2$ and DC correlate to actual resistivities of the invaded zone, $R_{xo}$, and may represent a range of resistivities determined over an increasing radial depth to provide an image profile of the formation. The conversion of the values of $D_1$, $D_2$ and DC to true resistivity values is most advantageously accomplished by the well known technique of "inversion" or "least squares inversion" or "system identification" in the data processing field. In addition, neural networks or other artificial intelligence tools could be used to achieve the same result. As seen in FIG. 13, an inversion process shown at 145 will convert the $D_1$, $D_2$ and DC values to $R_{xo}$ and $R_t$.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

We claim:

1. Apparatus for determining selected parameters of an earth formation surrounding a borehole, comprising:

(a) an instrument having a single source electrode for injecting an electrical current of a predetermined value into the formation surrounding the borehole, (b) a plurality of measurement electrodes vertically spaced from said source electrode along the body of said instrument, wherein successive groups of at least three selected adjacent measurement electrodes are adapted to derive first and second difference potentials between said at least three selected adjacent measurement electrodes within each said successive group of measurement electrodes, and wherein the locations of said successive groups of at least three selected adjacent measurement electrodes are uniformly and vertically spaced at increasing distances from said source electrode, (c) wherein said first and second difference potentials for each of said successive groups of measurement electrodes spaced vertically an increased distance from said source electrode are derived in response to current from said source electrode traveling generally vertically in an orientation generally parallel to the axis of the borehole in the geologic formation and spaced horizontally an increased radial distance surrounding the borehole and adjacent to the instrument, and (d) wherein a value representative of the selected formation parameter for said horizontal radial distance associated with each of said vertically spaced groups of at least three measurement electrodes may be derived from said first and second difference potentials for each of said groups of at least three measurement electrodes.

2. The apparatus of claim 1, wherein the selected formation parameter is resistivity of the formation.

3. A method for determining selected parameters of an earth formation surrounding a borehole, in accordance with the following steps:

(a) injecting an electrical current of a predetermined value into the formation surrounding the borehole from a single preselected source in the borehole, (b) initially deriving first and second difference potentials from a first predetermined group of at least three selected adjacent measurement positions vertically and axially spaced from said preselected current source in the borehole, (c) sequentially deriving first and second difference potentials from a plurality of successive predetermined groups of at least three selected adjacent measurement positions vertically and axially spaced at increasing distances from said preselected current source and from said first predetermined group of at least three selected adjacent measurement positions in the borehole, (d) wherein said first and second difference potentials obtained for each of said groups of measurement positions are responsive to current from said current source traveling generally vertically in an orientation generally parallel to the axis of the borehole in the geologic formation and spaced horizontally an increased radial distance surrounding the borehole and adjacent to the instrument, and (e) wherein a value representative of the selected formation parameter for said horizontal radial distance associated with each of said vertically spaced groups of at least three measurement positions may be derived from said first and second difference potentials for each of said groups of at least three measurement electrodes.

4. The method of claim 3, wherein the selected formation parameter is resistivity of the formation.

\* \* \* \* \*